United States Patent [19]
Hussey

[11] Patent Number: 5,467,890
[45] Date of Patent: Nov. 21, 1995

[54] CONTAINER FOR COLLECTING LEAKING HYDROCARBONS

[75] Inventor: Geary W. Hussey, Stafford, Tex.

[73] Assignee: B. Ann Hough, San Antonion, Tex.

[21] Appl. No.: 237,652

[22] Filed: May 4, 1994

[51] Int. Cl.⁶ .................................................. B65D 81/00
[52] U.S. Cl. ........................................... 220/571; 210/540
[58] Field of Search ....................... 220/571, 573, 220/501, 505, 506; 210/534, 536, 540

[56] References Cited

U.S. PATENT DOCUMENTS

| | | | |
|---|---|---|---|
| 883,903 | 4/1908 | Nuss | 210/534 |
| 1,147,881 | 7/1915 | Morris | 210/540 |
| 1,157,717 | 10/1915 | Packer | 210/540 X |
| 1,647,344 | 11/1927 | Cushman | 210/540 |
| 1,672,583 | 6/1928 | Travers . | |
| 2,248,893 | 7/1941 | Parent | 210/540 X |
| 2,404,872 | 7/1946 | Walker, Jr. . | |
| 3,527,348 | 9/1970 | LaLonde et al. . | |
| 3,948,767 | 4/1976 | Chapman . | |
| 3,965,013 | 6/1976 | Jackson | 210/534 X |
| 4,088,578 | 5/1978 | Yoshioka et al. | 210/540 X |
| 4,132,652 | 1/1979 | Anderson et al. | 210/536 |
| 4,554,074 | 11/1985 | Broughton | 210/540 X |
| 5,145,586 | 9/1992 | Taggart et al. . | |
| 5,178,778 | 1/1993 | Sachse et al. . | |
| 5,313,991 | 5/1994 | Murray et al. . | |

OTHER PUBLICATIONS

Brochure of Pollution Control, Inc. of Chickasha, Okla. with accompanying literature dated Jun. 1, 1992.

*Primary Examiner*—Steven M. Pollard
*Attorney, Agent, or Firm*—Vaden, Eickenroht, Thompson & Feather

[57] ABSTRACT

There is disclosed a container for collecting hydrocarbons which might leak from a source, such as a loading or unloading line of and oil storage tank, and which, for environmental purposes, should not be permitted to spill out of the container into the open area. The container is of such construction that a hard rain or other addition of large quantities of water to the container will not cause the hydrocarbons to spill out of the container.

4 Claims, 1 Drawing Sheet

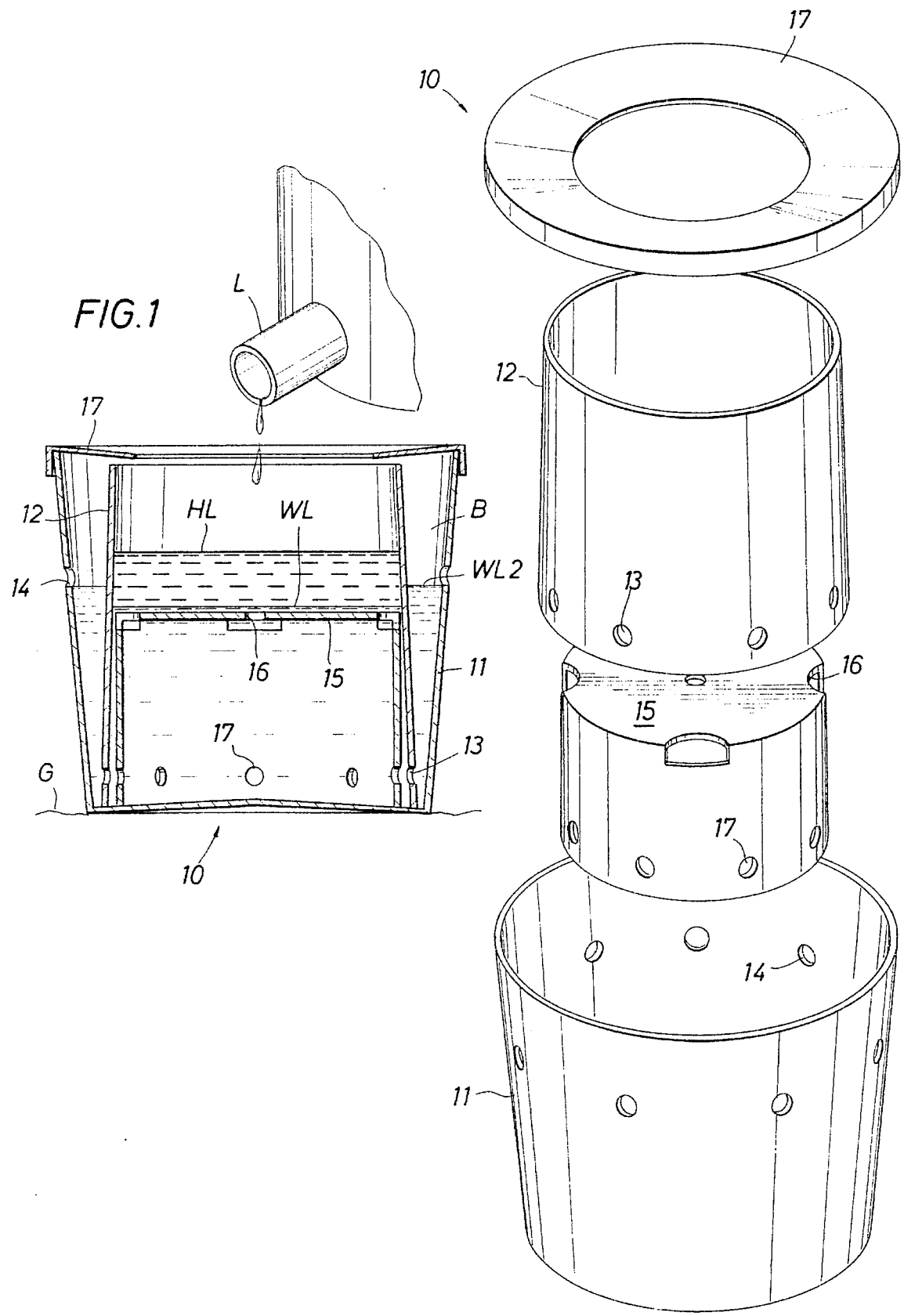

CONTAINER FOR COLLECTING LEAKING HYDROCARBONS

This invention relates to containers for collecting leaking hydrocarbons. More particularly, it relates to improvements in containers in which the source of leakage is in an open area such that the container collects rain water along with the hydrocarbons.

The need for such a container may occur, for example, at the loading and unloading line of an oil storage facility where the valve for opening and closing the line may leak because of wear or damage. The leakage of oil from the line, even in small quantities, could present a serious environmental problem if allowed to spread over the surrounding ground surface.

It has long been the practice, therefore, to dispose open containers beneath the end of the line. However, rain water as well as leaking oil will be collected in the container, with the oil, of course, rising to the top of the water. Although proper maintenance procedures require that the oil be removed from the container from time to time, this does not always occur. Consequently, a hard rain, particularly between scheduled maintenance checks, may cause the oil to spill out onto the ground.

Also, Pollution Contol Ltd., of Chickashaw, Okla., makes and sells a container having a pair of openings in its side, one for disposal over the end of the line and the other to receive a hose for connection to the line, and a lid for covering the open upper end of the container to prevent the entry of rain water, which would raise the level of oil leaking into the container.

The lid, of course, is removable to permit access to the ends of the line and hose as they are made up or broken out. Obviously, this complicates connection and disconnection of the line and hose. Furthermore, there is always the risk that the lid will be left off, so that rain water could raise the level of the oil to that of the side openings to force it out onto the surrounding ground.

The object of this invention is to overcome these and other problems in prior art containers for this purpose by providing a container in which the hydrocarbons may be collected without serious risks of their spilling onto the ground despite heavy rains, but which, at the same time, is of such construction that it does not interfere with connecting or disconnecting lines at the source of the leakage, and also facilitates its movement from one location to another with the least possible time and effort.

This and other objects are accomplished, in accordance with the illustrated embodiment of this invention, by a container which is adapted to be disposed in an upright position and has an outer wall and an inner wall dividing it into first and second side-by-side sections, with the upper end of the first section being open to receive such hydrocarbons when arranged beneath the leaking source. The inner wall has first openings connecting the lower ends of its first and second sections, and the outer wall has second openings connecting the second section to the outside of the container intermediate its upper and lower ends. Thus, upon priming of the container with water, additional water entering the first section will flow by gravity through the first openings into the outer section and through the second openings out of the container whereby the hydrocarbons are maintained at a level in the first section above the water therein.

In its preferred and illustrated form, the container comprises an outer vessel and an inner vessel within the outer vessel to form a space between them, with the upper end of the inner vessel forming the first section whose open upper end is disposable beneath the source to receive such hydrocarbons when the container is upright, and the first openings connecting the lower ends of the inner vessel and space, and the second openings connecting the space to the outside of the container intermediate its upper and lower ends.

Preferably, a generally horizontal wall extends across the first section or inner vessel at a level beneath the openings in the outer wall or outer vessel and has third openings therein to permit hydrocarbons and water to flow therethrough. In this way, a suction hose for removing the hydrocarbons from the drum cannot be inserted beneath the lower level of the hydrocarbons. It is also preferred that a lid be provided for covering the open upper end of the second section or space in order to prevent the escape of condensation of the water therefrom.

In the drawings, wherein like reference characters are used throughout to designate like parts:

FIG. 1 is a vertical sectional view of the container having the open upper end of its inner vessel disposed beneath the end of the loading or unloading line, and showing the water level in the inner vessel just above the horizontal wall thereof, the oil above the water, and water in the space between the inner and outer vessels maintained at the level of the outlets from the outer wall above the level of the water in the inner vessel; and FIG. 2 is a perspective view of the container, with the parts thereof shown in exploded fashion.

With reference now to the details of the above described drawings, the over-all container, best shown in FIG. 1, which is indicated in its entirety by reference character 10, includes an outer vessel 11 disposed in an upright position on a ground surface G and an inner vessel 12 disposed within the outer vessel to form an annular space S between them. As shown, the upper end of the inner vessel is open and arranged beneath the end of the loading and unloading line L of an oil storage facility so that oil leaking therefrom will enter the inner vessel. Thus, the inner vessel divides the container into an inner section on its inner side and an outer section within the space S between the inner and outer vessels.

As illustrated, the outer vessel may comprise a conventional open-ended, frusto-conical drum, while the inner vessel 12 may comprise a similar, but somewhat smaller, drum to provide the space S between them and arranged in an inverted position within the outer drum with its lower end cut off to form its open upper end.

As also shown in FIG. 1, a body of water is disposed within the inner vessel to a level indicated at WL, and a body of hydrocarbons, usually oil, is contained in the inner vessel above the water level to a lever HL. As also shown in FIG. 1, a second body of water disposed within the second section or space S of the container to a level WL2 above the level WL within the inner vessel, but below the upper lever $H_L$ of the hydrocarbons. These levels will, of course, be determined by the relative volumes of water and oil within the container, as well as their respective specific gravities, it being understood that, due to the lighter hydrocarbons, the column of liquids in the inner drum will be higher than the column within the space S.

As previously indicated, water will flow from the inner vessel into the space S through openings 13 formed in the lower end of the inner vessel, while water exits the space S through openings 14 formed in the outer vessel intermediate its upper and lower ends, and thus above the level of the lower openings 13. Obviously, there may be a greater or lesser number of openings arranged other than as shown.

As previously indicated, and as will now be better understood, the water WL is determined by the lower edge of the openings 14. At the same time, the disposal of the lower openings 13 toward the lower ends of the inner drum ensures that oil does not enter the space S so long as the water level is maintained above that of the openings 13. Thus, it is important that, in use, the container be initially primed with water to a level at least above the openings 13, and that water be maintained at a level thereabove. On the other hand, the addition of water to the container as by means of a hard rain, does not present a problem, since the water merely passes through the oil into the lower end of the inner vessel, and then through the openings 13 and out the openings 14 to maintain its level at WL.

As also previously indicated, the container also includes a horizontal wall 15 extending across the inner section of the container and having openings 16 therein to permit water to pass therethrough into the lower end of the inner container and into the space S for flow and out the side of the container. As illustrated, the horizontal wall 15 comprises the lower end of an inverted drum, which has been cut off to the desired level, thus consistent with the over-all simplied construction of the container. Due to this preferred construction, holes 17 are formed in the lower end of the inverted partial drum generally opposite the holes 13 so as to connect the portion of the inside first section of the container within the inverted drum with the holes at generally the same level as the holes 13.

As shown, the horizontal wall 15 is preferably just below the water level WL and thus below the body of hydrocarbons within the inner drum. Thus, as previously indicated, the primary purpose of the horizontal wall is to prevent a suction hose from being pushed downwardly into the water level to a depth for withdrawing it from the container to a level beneath that of holes 13.

It is contemplated that the leakage from the line will not be so great as to cause oil to fill the inner vessel below its level HL, and thus cause it to spill over into the space S and thus out of the container. That is, the leakage is normally of such small volume so that, with ordinary care, the amount that accumulates in the inner drum can be sucked out on a periodic basis. On the other hand, the possibility of a heavy rain, or other cause for water to be emptied into the inner drum, presents no problem, since that added water merely passes downwardly through the oil level for circulation through the lower openings and out the side openings 14 onto the ground surrounding the drum.

As also shown, and previously described, the container also preferably includes an annular lid 17 which is supported on the upper edge of the outer vessel for disposal over the upper end of the annular space. As previously described, this causes condensation from the space to accumulate on the lower side of the lid and thus drop back into the space rather than being lost to the atmosphere.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. For use in collecting hydrocarbons from a leaking source, a container adapted to be disposed in an upright position and having an outer wall and an inner wall dividing the container into first and second side-by-side sections, the upper end of the first section being open to receive such hydrocarbons when arranged beneath the leaking source, said inner wall having first openings connecting the lower ends of the first and second sections of the container, said outer wall having second openings connecting the second section to the outside of the container intermediate its upper and lower ends, whereby, upon priming of the container with water, additional water entering the first section will flow by gravity through the first openings into the second section and through the second openings out of the container, and being otherwise imperforate whereby hydrocarbons are maintained at a level in said first section above the water therein and a generally horizontal wall extending across the first section at a level beneath the openings in the outer wall and having third openings therein to permit hydrocarbons and water to flow therethrough and into and through the first openings into the second section.

2. A container of the character defined in claim 1, wherein the open upper end of the second section is adapted to be covered by a lid to prevent the escape of condensation of the water from the second section but enable additional water to enter the first section.

3. For use in collecting hydrocarbons from a leaking source, a container comprising an outer vessel and an inner vessel within the outer vessel to form a space between them, the upper end of the inner vessel being open for disposal beneath the source to receive such hydrocarbons when the container is upright, said inner vessel having first openings connecting the lower ends of the inner vessel and the space, said outer vessel having second openings connecting the space to the outside of the container intermediate its upper and lower ends, whereby, upon priming of the container with water, additional water entering the inner vessel will flow by gravity through the first openings into the space and through the second openings out of the container, and being otherwise imperforate whereby hydrocarbons are maintained at a level in said inner vessel above the water therein a generally horizontal wall extending across the inner section at a level beneath the openings in the outer wall and having third openings therein to permit hydrocarbons and water to flow therethrough and into and through the first openings into the second section.

4. A container of the character defined in claim 3, wherein the open upper end of the space is adapted to be covered by a lid to prevent the escape of condensation of the water from the space but enable additional water to enter the first section.

\* \* \* \* \*